United States Patent [19]

Minnick

[11] Patent Number: 5,098,778
[45] Date of Patent: Mar. 24, 1992

[54] PLASTIC BASED LAMINATES COMPRISING OUTER FIBER-REINFORCED THERMOSET SHEETS, LOFTED FIBER-REINFORCED THERMOPLASTIC SHEETS AND A FOAM CORE LAYER

[75] Inventor: Michael G. Minnick, Coshocton, Ohio

[73] Assignee: General Electric Company, Worthington, Ohio

[21] Appl. No.: 514,054

[22] Filed: Apr. 24, 1990

[51] Int. Cl.⁵ .................. B32B 15/00; B32B 3/26; B32B 7/12; B32B 5/06
[52] U.S. Cl. .................. 428/285; 428/284; 428/290; 428/298; 428/302; 428/304.4; 428/306.6; 428/307.3; 428/308.4; 428/316.6; 428/317.7; 428/317.9; 428/408; 428/902; 428/920; 428/921
[58] Field of Search ............ 428/284, 285, 290, 316.6, 428/317.9, 920, 921, 251, 298, 302, 304.4, 306.6, 307.3, 308.4, 317.7, 408, 902

[56] References Cited

U.S. PATENT DOCUMENTS

| | | | |
|---|---|---|---|
| 2,465,319 | 3/1949 | Whinfield et al. | 526/71 |
| 3,047,539 | 7/1962 | Pengilly | 528/285 |
| 3,331,174 | 7/1967 | Wesch et al. | 52/309.11 |
| 3,716,449 | 2/1973 | Gatward et al. | 162/101 |
| 3,934,066 | 1/1976 | Murch | 428/248 |
| 3,994,631 | 3/1976 | Yu et al. | 417/506 |
| 4,001,184 | 1/1977 | Scott | 528/182 |
| 4,372,800 | 2/1983 | Oizumi et al. | 428/251 |
| 4,426,470 | 1/1984 | Wessling et al. | 524/35 |
| 4,463,043 | 7/1984 | Reeves et al. | 428/68 |
| 4,526,939 | 7/1985 | Lewarchik et al. | 525/438 |
| 4,690,860 | 9/1987 | Radvan et al. | 428/283 |
| 4,695,501 | 9/1987 | Robinson | 428/246 |
| 4,705,716 | 11/1987 | Tang et al. | 428/251 |
| 4,731,414 | 3/1988 | Ting et al. | 525/71 |
| 4,964,935 | 10/1990 | Biggs et al. | 428/317.9 |

FOREIGN PATENT DOCUMENTS

| | | |
|---|---|---|
| 0148760 | 7/1985 | European Pat. Off. . |
| 0148761 | 7/1985 | European Pat. Off. . |
| 1129757 | 10/1968 | United Kingdom . |
| 1329409 | 9/1973 | United Kingdom . |

OTHER PUBLICATIONS

Hall, U.S. application Ser. No. 07-350-654, Apr. 11, 1989.

Primary Examiner—George F. Lesmes
Assistant Examiner—James D. Withers
Attorney, Agent, or Firm—Gary L. Loser

[57] ABSTRACT

A light weight, high strength laminate having improved fire resistant characteristics and the method of making the same. A preferred embodiment includes a low density fiber reinforced thermoplastic resin core between two parallel sheets of high density fiber reinforced thermoset resin. Another embodiment includes a core of polymeric foam laminated between two parallel inner fiber reinforced thermoplastic resin layers each of which face an outer layer of fiber reinforced thermoplastic resin.

4 Claims, 1 Drawing Sheet

PLASTIC BASED LAMINATES COMPRISING OUTER FIBER-REINFORCED THERMOSET SHEETS, LOFTED FIBER-REINFORCED THERMOPLASTIC SHEETS AND A FOAM CORE LAYER

TECHNICAL FIELD

This invention is directed to light weight, high strength laminates having improved fire resistant characteristics and more particularly to light weight, high strength laminates of high density, fiber-reinforced thermoset resin, and low density thermoplastic resin, and the method of making the same.

BACKGROUND OF THE INVENTION

Laminates are well known in the art, particularly for use as prefabricated building panels. Composite panels, such as those disclosed in U.S. Pat. No. 3,331,174, provide light weight economical structures, wherein a stiff foam core fills the area between two parallel fiber reinforced plastic sheets spaced apart by spacing members. The foam is adhered to the inner surface of each plastic sheet as well as to each spacing member. However, such spacing members contribute to the weight of these prior art composite panels. Conventional materials used in prefabricated structures, such as wood, plywood, particle board or oriented strand board, as well as laminates such as those mentioned above, while providing sufficient levels of strength and economy, generally exhibit a low level of fire resistance.

Light weight, high strength fire resistant structures having a compressed fiber reinforced thermoplastic layer covering a foam or wooden substrate are known in the art. When exposed to temperatures normally experienced in a fire, the fiber reinforced thermoplastic layer expands or "lofts" to twice its original thickness, thus creating a fire barrier protecting the substrate. Although these lofted thermoplastic materials combine stiffness and strength with both light weight and high fire resistance, the surfaces of the lofted thermoplastic structures are porous. The porous nature of such materials is disadvantageous for use as building panels because it permits water absorption; it provides a poor surface for repainting; and it results in poor insulating properties.

SUMMARY OF THE INVENTION

It is the primary object of the present invention to provide improved light weight, low density, high strength, fire resistant laminates.

It is another object of the present invention to provide a laminate which possesses the stiffness, strength and fire resistance of the lofted, fiber-reinforced thermoplastic laminates without the porosity generally characteristic of such materials.

Another object of the present invention is to provide improved light weight, low density, high strength, fire resistant laminates which act as barriers to air and moisture and which have surfaces suitable for the application of coatings.

It is an object of the present invention to provide a structure possessing the superior properties of the aforementioned lofted fiber reinforced thermoplastic material which also has a paintable surface capable of acting as an air and moisture barrier.

It is a further object of the present invention to provide high strength laminates of simplified design without spacing members.

It is another object of the present invention to provide a method of making the aforementioned laminates.

These and other objects of the present invention are achieved by providing a low weight, high strength laminate having two spaced parallel sheets of fiber-reinforced thermoset resin and at least one layer of fiber-reinforced lofted thermoplastic resin laminated between the two parallel sheets of fiber reinforced thermoset resin. In certain embodiments, the objects of the present invention are also achieved by placing a core layer of polyphenylene ether, polystyrene or polyurethane foam or mixtures thereof within the fiber-reinforced, lofted thermoplastic resin.

In another aspect of the present invention, there is provided a method of making a low weight, high strength laminate wherein a layer of fiber reinforced thermoplastic resin capable of being lofted is placed between two sheets of fiber reinforced thermoset resin to form a composite. The composite is pressed at an elevated temperature for a sufficient time to compact the layers thereby forming a laminate. The pressure is then controllably released from the laminate, at the elevated temperature, forming a laminate having a lofted fiber reinforced thermoplastic core.

In another aspect of the method of the present invention, after the pressure is controllably released from the laminate at the elevated temperature, the laminate lofts while cooling to room temperature, and thereafter a polymeric foam, such as a polyphenylene ether-polystyrene foam blend, polystyrene foam, polyurethane foam or a mixture thereof, is placed adjacent the thermoset layers of two parallel laminates each having a thermoplastic layer and a thermoset layer and are thereafter pressed in a preheated press having mechanical stops on either side until the foam bonds to the thermoplastic layers. After the form has bonded to the thermoplastic layers, the temperature is lowered to ambient and the pressure is released.

In one embodiment of the present invention there is provided a laminate having a core of glass fiber reinforced thermoplastic resin between two parallel sheets of glass fiber reinforced thermoset resin. A further embodiment having even lower weight and increased resistance has a polyphenylene ether polystyrene blend, polystyrene, or polyurethane foam core between two parallel inner thermoplastic layers, each of which face an outer layer of glass cloth prepreg polyphenylene ether epoxy thermoset resin.

The present invention provides an improved laminate for use, for example, as building panels in the modular home segment of the construction industry. The fabrication of a laminate having high density outer skin layers and a low density lofted fiber reinforced thermoplastic core enhances the effective stiffness per unit weight, strength, and fire resistance, as well as, reduces the weight of prefabricated construction materials. Furthermore, the thermoset outer layers not only improve the chemical resistance of the building material, but also decrease the porosity, thereby creating an air and vapor barrier.

Other objects and advantages of the present invention will be apparent from the following Detailed Description and the accompanying drawings.

DETAILED DESCRIPTION OF THE PRESENT INVENTION

Figure 1:
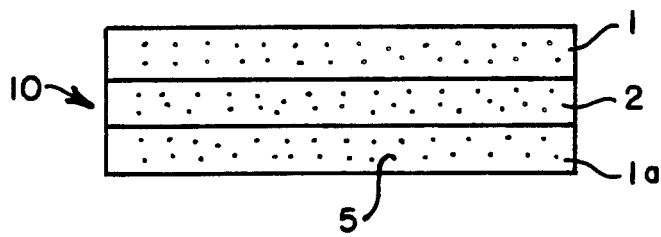
FIG. 1 is a cross sectional view of a 3 layer laminate in accordance with the present invention.

Referring now to the drawings, wherein like reference numerals designate like or corresponding elements throughout the views and particularly referring to FIG. 1, there is shown laminate 10 of the present invention having layer 2, a fiber reinforced thermoplastic material, between two parallel sheets of fiber reinforced thermoset resin 1 and 1a. Laminate 10 is formed by pressing a composite, which includes layer 2 disposed between two parallel sheets 1 and 1a, at an elevated temperature for a sufficient time to compact the layers and then controllably releasing pressure from laminate 10. Preferably, the composite is pressed between about 500 p.s.i. and about 1500 p.s.i. at a temperature between about 210° C. and 300° C. from about 10 minutes to about an hour. In one aspect of the present invention the composite is pressed between platens of a press. At the elevated temperature the pressure is released from the composite by opening the platens of the press a predetermined distance, preferably between about $\frac{1}{2}$ inch and about $\frac{3}{8}$ inch, thereby allowing Layer 2 to expand and fill the opening while cooling to room temperature.

Figure 2:
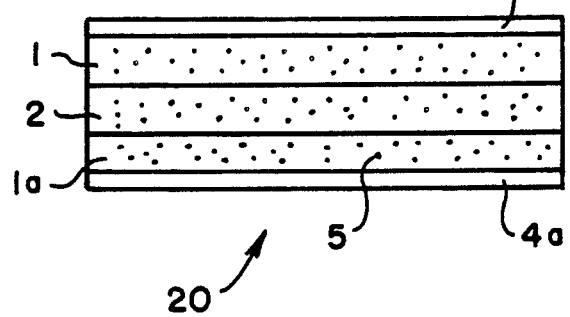
FIG. 2 is a cross sectional view of a 5 layer laminate in accordance with the present invention.

In FIG. 2 there is shown a laminate 20 which is laminate 10 covered on at least one side by an outer layer 4 and optionally covered on the opposite side by an outer layer 4a. Layers 4 and 4a are a crosslinked acrylate elastomer, a crosslinked styrene acrylonitrile copolymer, and a linear styrene acrylonitrile available from General Electric Company under the trademark Geloy, discussed in more detail below.

Figure 3:
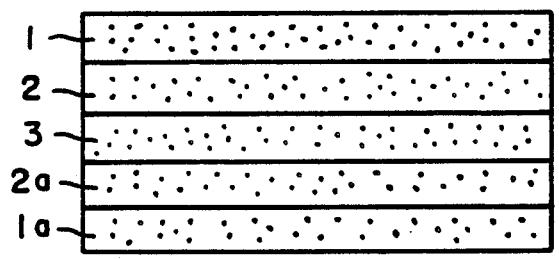
FIG. 3 is a cross sectional view of an alternate 5 layer laminate in accordance with the present invention.

FIG. 3 shows a laminate 30 in which a polyphenylene ether-polystyrene foam blend, polystyrene, or polyurethane foam layer 3 is disposed between layers 2 and 2a. Layer 3 may be placed adjacent the thermoplastic layers of two parallel lofted laminates, each having a thermoplastic layer and a thermoset layer. The thickness of the layers may vary. Preferably layers 2 and 2a are of equal thickness, symetrically sandwiching layer 3. Layer 3 may be adhesively bonded to layer 2 by pressing the layers in a preheated press, with mechanical stops on either side of the composite until the foam bonds to each thermoplastic layer and then cooling, thereby forming a low weight high strength laminate. Preferably the adhesive is a hot melt adhesive with a melting point between 80° C. and 120° C. The hot melt adhesive film available from Shell Chemical, Inc. under the tradename Krayton FG 1901X is highly preferred.

Figure 4:
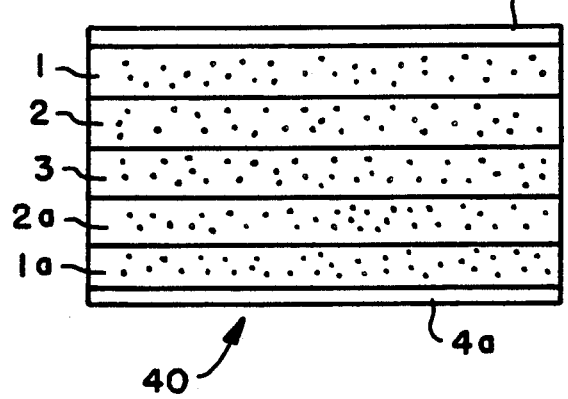
FIG. 4 is a cross sectional view of a seven layer laminate in accordance with the present invention.

FIG. 4 shows a laminate 40, which is laminate 30 covered on at least one side by an outer layer 4 and optionally on the opposite side by layer 4a. Layers 4 and 4a are Geloy cladding discussed in more detail below.

The fire resistant fibers 5, used in the laminates of the present invention, are preferably in the form of single discrete fibers and preferably have a high modulus of elasticity. The fire resistant fibers preferably neither melt nor lose their high modulus of elasticity at temperatures below about 400° C., and more preferably at about 600° C. Suitable fibers include glass, carbon (graphite), silicon carbide, mineral and other ceramic fibers and certain polymeric fibers, such as aramid fibers sold under the trade names Kevlar and Nomex. Preferably, the fibers have a modulus of elasticity higher than about 10,000 Mega Pascals.

Suitable fibers have at least about 50% by weight fiber strands having a length between about 0.125 inch and about 1.0 inch, more preferably between about 0.125 inch and about 0.5 inch, and most preferably about 0.5 inch. The fibers preferably have an average diameter of from between about 2 microns and about 30 microns, more preferably between about 12 microns and about 23 microns and most preferably about 16 microns. Fiber length is important in providing a desired level of lofting in structure upon exposure to heat. Fibers which are either too long or too short provide inadequate levels of lofting. Fiber diameters are important in providing the desired levels of fiber stiffness. Fibers which are too thin lack the desired levels of stiffness for lofting and fibers which are too thick are also generally too stiff and break during compression.

In layers 2 and 2a the binder material is an organic thermoplastic material, which upon consolidation forms a solid matrix serving to bond the fibers together in the composite layer. Suitable thermoplastic materials for forming a binder matrix include polyolefins, polyesters, polyamides, polyethers, polycarbonates, acrylonitrile styrene-butadiene copolymer, polyvinylchloride, and polystyrenes.

Suitable polyolefins include a polymerization product of at least one aliphatic ethylenically unsaturated monomer and are selected from polyethylene and other polyolefins and copolymers of such monomers, for example, polyethylene, polybutene, polypropylene, polypentene, poly(methylpentene), normally solid copolymer of ethylene and butene-1, copolymers of ethylene and ethyl acrylate, or vinyl acetate, butadiene- acrylonitrile copolymers, ionomers, poly(methyl methacrylate), polyisobutylene rubbers and the like, poly(vinyl chloride), poly(vinylidene chloride), a copolymer of vinyl chloride with vinyl acetate, natural rubber, a rubbery copolymer of butene-1 and ethylene, a rubbery copolymer of butadiene and acrylonitrile, and the like. All such polymers are commercially available or can be prepared by techniques well known to those skilled in the art. As to the copolymers and terpolymers, the proportions of the repeating units may vary broadly and will be selected to provide the desired characteristics, i.e., normally rubbery, normally solid, and the like. In addition to the polymers illustrated above, other suitable polymerization products of aliphatic ethylenically unsaturated monomers include derivatives thereof, such as halogenated hydrocarbon polymers, e.g., chlorinated polyethylene, chlorosulfonated polyhydrocarbons and polymerized carboxy-substituted butadiene and the like.

Other preferred thermoplastics are selected from polyacetal homopolymers, such as polyoxymethylene, polyacetal copolymers, such as those based on trioxane, polyphenylene ethers, such as poly(2,6-dimethyl-1,4-phenylene)ether, polysulfones, such as the condensation product of bisphenol A and 4,4'-dichlorodiphenyl sulfone, polyamides, such as polycaprolactam, or the product of hexamethylenediamine an adipic acid, polyimides, e.g., the product of bismaleimido diphenyl methane and methylene dianiline, normally solid or normally rubbery polyorganosiloxanes, such as polyalkyl or arylsiloxanes, or combinations of the two, and copolymers of polyorganosiloxanes with vinyl aromatics, e.g., styrene, acrylic monomers, e.g., methyl methacrylate, or aromatic esters, e.g., the reaction products of bisphenol A and iso or terephthaloyl chloride, as well as siloxane-nitrogen copolymers containing amido, amide-imido and imide groups. All such polymers are either commercially available or can be made in ways known to those skilled in the art.

Also preferred are thermoplastics which comprise mixtures of any of the above-mentioned thermoplastics. For example, one such mixture would comprise a high molecular weight composition which is a combination of polystyrene or other styrene resin, including rubber modified polystyrenes with a condensation product of 2,6-dimethylphenol, i.e., poly(2,6-dimethyl-1,4-phenylene)ether.

Typical of the polyester resins suitable for this invention are poly(alkylene terephthalates, isophthalates or mixed terephthalates and isophthalates), wherein the alkylene groups contain from 2 to 10 carbon atoms. They are available commercially or can be prepared by known techniques, such as by the alcoholysis of esters of the phthalic acid with a glycol and subsequent polymerization, by heating glycols with the free acids or with halide derivatives thereof, and similar processes. These are described in U.S. Pat. Nos. 2,465,319 and 3,047,539 and elsewhere.

Although the glycol portion of such typical polyesters can contain from 1 to 10 carbon atoms, e.g., 1,2-ethylene, 1,3-propylene, 1,4-butylene, 1,3-butylene, 1,2-propylene, 1,2-butylene, 2,3-butylene, 1,6-hexylene, 1,10-decylene, etc., it is preferred that it contain 2 or 4 carbon atoms, in the form of linear methylene chains.

Preferred polyesters will be of the family consisting of high molecular weight, polymeric 1,4-butylene glycol terephthalates or isophthalates having repeating units of the general formula:

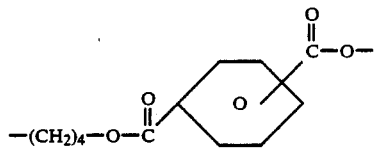

and mixtures of such esters, including copolyesters of terephthalic and up to about 30% isophthalic acids.

Especially preferred polyesters are polyethyleneterephthalate, poly(1,4-butylene 70/30 isoterephthalate) and poly(1,4-butylene terephthalate). Special mention is made of the latter because it is easy to prepare from readily available materials and crystallizes at an especially rapid rate.

Illustratively, sufficiently high molecular weight polyesters of the preferred type will have an intrinsic viscosity of at least about 0.2 and preferably about 0.4 deciliters/gram as measured in o-chlorophenol, a 60/40 phenol-tetrachloroethane mixture or a similar solvent at 25°–30° C. The upper limit is not critical, but will generally be about 1.5 dl./g. Especially preferred polyesters will have an intrinsic viscosity in the range of about 0.5 to about 1.3.

Suitable aromatic polycarbonate resins are the polymers derived from a bivalent phenol and a carbonate pre-product, for example phosgene, a halogen formate or a carbonate ester. The aromatic polycarbonate resins preferably possess an intrinsic viscosity of approximately 0.35–0.75 (measured in p-dioxane at 30° C. and expressed in deciliters per gram). Suitable bivalent phenols which may be used for the preparation of these aromatic polycarbonate resins are mononucleus and multinuclei aromatic compounds which comprise 2-hydroxyl groups as functional groups which are both directly bonded to a carbon atom of an aromatic nucleus. Examples of suitable bivalent phenols are: 2,2-bis(4-hydroxy-phenyl) propane (Bisphenol A=BPA), resorcinol; bis(4-hydroxy-5-nitrophenyl) methane; 2,2'-dihydroxydiphenyl; 2,6-dihydroxynaphthalene; bis-(4-hydroxy-phenylsulfone); 5'-chloro-2,4'-dihydroxyldiphenyl sulphone; 4,4'-dihydroxydiphenyl ether; and 4,4'-dihydroxy-2,5-diethoxydiphenyl ether.

In preparing the aromatic polycarbonate resins it is possible to use two or more different bivalent phenols or a copolymer of a bivalent phenol with a glycol or with a polyester with a hydroxy or acid terminal group. The aromatic polycarbonate resin may also be prepared in the presence of a dibasic acid. Crosslinked polycarbonate resins as described in U.S. Pat. No. 4,001,184 are also suitable. It is also possible to use a mixture of two or more of the above-mentioned polycarbonate resins. The homopolymer derived from bisphenol A is preferably used as a polycarbonate resin.

Upon exposure to heat and flames, the binder material burns, decomposes or experiences reduced viscosity resulting in the release of the fiber web allowing the web to loft. Generally, the longer the fiber length for randomly dispersed glass fibers, the greater the web will loft and the greater the web will protect the substrate. In other words, the longer the fibers in a randomly dispersed compressed fiber system, the greater the degree of loft obtained upon decompression. The compressed composite layers are made by consolidating into a solid continuous form, by heat and pressure, an unconsolidated, lofted wed including randomly disperred fibers and binder material. The pressure causes the fibers to be compressed, and the heat, in the case of thermoplastic binder materials, serves to melt the thermoplastic, which then flows around the fibers and upon cooling forms a solid matrix which locks the fibers into a compressed state.

As mentioned above, the preferred binder materials are thermoplastics. Preferably, the thermoplastic is, prior to dispersion and consolidation, in the form of a fine powder or particulate. The plastics may also be in a needle or fibrous form prior to dispersion and consolidation. The fibers and thermoplastic powder or particulates can be randomly dispersed to form a lofted web by any of various well known dispersion processes including dry blending, aqueous dispersion, latex dispersion and foam dispersion processes. Suitable processes are set forth in United Kingdom Patent 1,129,757, United Kingdom Patent 1,329,409, European Patent Application 0,148,760, European Patent Application 0,148,761, U.S. Pat. No. 4,426,470, and U.S. Pat. No. 3,716,449, all of which are incorporated herein by reference. Extrusion processes involving the mixing of fibers and thermoplastics are generally not suitable, in that they lead to substantial breakage of the fibers resulting in fibers of insufficient length for the desired level of lofting. The above dispersion processes result in the formation of a web of randomly dispersed fibers in thermoplastic powder. The web is initially an unconsolidated web which is in a generally uncompressed state, lofted, and in the form of a mat. Defining the unconsolidated web as being in a generally X, Y plane, the randomly dispersed fibers generally have degrees of orientation in each of the X, Y and Z direction, the Z direction being perpendicular to the XY plane. While the fibers may be primarily oriented in the XY plane, they generally have some degree of orientation in the Z direction. Having a degree of orientation in the Z direction can facilitate the fibers being in a lofted state giving the web an initial unconsolidated thickness and a relatively low volume of glass. Upon being compressed to a compressed state, the fibers will, due to their high modulus of elasticity, exert forces in the Z direction in an effort to return the web to its initial unconsolidated thickness. Thus, when the unconsolidated web is heated and compressed and then cooled, the binder matrix upon solidification holds the compressed fibers in a compressed state thereby providing a relatively thin compressed composite layer. Later upon exposure of the composite layer to high levels of heat or flames, the binder matrix melts or burns allowing the fibers to loft in the Z direction thereby forming a thick lofted web of heat resistant fibers which act as a heat and fire barrier. Preferably layer 2 has about 40% to about 60% by weight polyphenylene ether thermoplastic binder and about 40% to about 80% by weight of a random dispersion of glass fibers.

Layers 1 and 1a have respective amounts of fire resistant fibers and a thermoset resin. Suitable thermoset materials for forming layers 1 and 1a of the laminate include polyesters, phenolics, epoxy and polyphenylene ether/epoxy blends. In one embodiment of the present invention the thermoset sheets have about 27% to about 80% by weight of epoxy of a polyphenylene ether epoxy blend and about 20% to about 73% by weight of glass fibers. In another aspect of the present invention the thermoset resin of the thermoset sheet is a phenolic modified epoxy thermoset resin impregnated into cotton linter paper. Suitable thermoset sheets include about 30% to about 75% by weight of polyphenylene ether-/epoxy prepreg and about 25% to about 70% by weight of woven or nonwoven glass cloth.

Layers 1 and 1a and layers 2 and 2a optionally have mineral fillers, preferably light weight and/or flame retardant. More preferably the mineral fillers are aluminum trihydrate, magnesium hydroxide, or mixtures thereof.

Layers 4 and 4a, as mentioned above, are a material which includes about 10% to about 50% crosslinked acylate elastomer, about 5% to about 35% crosslinked styrene-acrylonitrile copolymer, and about 15% to about 85% linear styrene-acrylonitrile copolymer; as disclosed in U.S. Pat. No. 3,994,631 incorporated herein by reference.

In order that those skilled in the art may be better able to practice the present invention, the following examples are given as illustrations of the superior strength, stiffness, weight reduction, as well as the improved thermal, moisture and flame resistance of the present invention. It should be noted that the invention is not limited to the specific details embodied in the Examples.

EXAMPLES 1-6

Laminates were prepared by pressing the layers shown in Table 1 at a pressure between about 500 psi and about 1500 psi for about 10 minutes to an hour, and then opening the platens of the press about ¼" to ⅜" thereby allowing the thermoplastic or foam core to expand and fill the opening while cooling to room temperature.

TABLE I

Laminate Layers of Some Embodiments of the Invention

| EXAMPLE I: | GELOY CLADDING |
| | PPO/EPOXY Blend (110 g/SF) |
| | LOFTED THERMOPLASTIC PPO |
| | (880 g/SF) |
| EXAMPLE II: | GELOY CLADDING |
| | GETEK 7628 PREPREG |
| | LOFTED THERMOPLASTIC PPO |
| | (880 g/SF) |
| EXAMPLE III: | GELOY CLADDING |
| | GETEK 7628 PREPREG |
| | LOFTED THERMOPLASTIC PPO |
| | (110 OR 220 g/SF) |
| | KRATON ADHESIVE |
| | GECET LOW DENSITY FOAM |
| EXAMPLE IV: | GELOY CLADDING |
| | EPOXY PAPER PREPREG |
| | LOFTED THERMOPLASTIC PP |
| | (110 g/SF) |
| | KRATON ADHESIVE |
| | EPS or GECET LOW DENSITY FOAM |
| EXAMPLE V: | GELOY CLADDING |
| | EPOXY PAPER PREPREG |
| | KRATON ADHESIVE |
| | EPS LOW DENSITY FOAM |

The Geloy cladding used was 10 millimeters in thickness and commercially available from General Electric Company.

The PPO/Epoxy blend was 68% polyphenylene oxide (PPO), commercially available from General Electric Company, 27% EPON 828, commercially available from Shell Chemical, 3% zinc stearate commercially available from Witco Co., and 2% Epolite 2347, commercially available from Hexcel Corp., compounded in Banbury at 200° F. and the granulated in powder through a 20 mesh screen. The PPO/Epoxy layer was 50% by weight resin combined with 50% by weight ½ inch T or G filament glass, commercially available from PPG Industries to form 110 g/ft. mat.

The lofted thermoplastic polyphenylene oxide layer was 50% by weight polyphenylene oxide commercially available from General Electric Company and 50% by weight ½ inch G filament glass fibers, commercially available from PPG Industries. The total weight per square foot ranges from about 100 grams to about 880 grams. This layer was made by pressing a PPO/epoxy layer at 500 psi, 265° C., for 10 minutes, then releasing pressure and opening platens ¼" (or ⅜") until cooled.

The GECET prepreg was 7628 glass cloth, commercially available from BGF Industries, impregnated with a polyphenylene/epoxy resin blend, and then dissolved in toluene and dried at elevated temperature. The resin content was about 40% to 45%.

The GECET low density foam is a blend of about 35% to about 50% polyphenylene oxide and 50% to about 65% of polystyrene, commercially available from General Electric Company, as extruded foam or expanded bead board.

A commercially available construction grade EPS low density foam, weighing 0.7 pounds per cubic foot, was compressed from 4.5 inches of thickness to a core less than ¼ inch thick.

The Kraton adhesive FG1901X, was commercially available from Shell Chemical in 4 to 5 mil films cast from VM & P Naphtha solution.

The Epoxy Paper prepreg was 16063 paper prepreg, commercially available from General Electric Electromaterials Company. It consisted of a phenolic modified epoxy formulation impregnated into 20 mil cotton linter paper. The resin content was approximately 60%.

The lofted thermoplastic polypropylene was approximately 50% polypropylene commercially available from Himont Company and 50% ½ inch M filament glass commercially available from PPG Industries.

Table II shows a comparison of mechanical properties of laminates according to the present invention with commercially available 3-ply plywood, 5-ply plywood, and oriented strand board, as well as, conventional lofted thermoplastic composites.

TABLE II

PROPERTIES OF LAMINATE CONSTRUCTIONS

| | DENSITY (LBS/CF) | THICKNESS (INCHES) | FLEX MOD (Mpsi) | FLEX STR (Mpsi) | SPECIFIC STIFFNESS | | SPECIFIC STRENGTH | |
|---|---|---|---|---|---|---|---|---|
| | | | | | L | C | L | C |
| 3 Ply Plywood | 41 | 0.38 | 1400-L** | 10-L | 1.0 | 10.4 | 1.0 | 3.3 |
| | | | 135-C** | 3-C | 0.1 | 1.0 | 0.3 | 1.0 |
| 5 Ply Plywood | 34 | 0.49 | 870-L | 6-L | 1.1 | 11.3 | 0.7 | 2.4 |
| ORIENTED STRAND | 42 | 0.225 | 450-L | 2.5-L | 0.3 | 3.1 | 0.3 | 0.8 |
| BOARD | 41 | 0.44 | 500-L | 2.5-L | 0.4 | 3.3 | 0.3 | 0.8 |
| LOFTED THERMOPLASTIC | 45 | 0.38 | 415 | 7.4 | 0.2 | 2.3 | 0.6 | 2.0 |
| EXAMPLE I | | | | | | | | |
| (T GLASS SKIN) | 47 | 0.49 | 590 | 9.9 | 0.3 | 2.9 | 0.8 | 2.5 |
| (G GLASS SKIN) | 38 | 0.59 | 270 | 4.3 | 0.2 | 2.5 | 0.5 | 1.7 |
| EXAMPLE II | 41 | 0.48 | 500 | 5.2 | 0.4 | 3.7 | 0.5 | 1.7 |
| EXAMPLE III | | | | | | | | |
| (220 g LOFTED R) | 33 | 0.51 | 340 | 3.9 | 0.5 | 4.8 | 0.6 | 2.0 |
| (110 g LOFTED R) | 26 | 0.50 | 315 | 4.2 | 0.9 | 9.1 | 1.1 | 3.5 |
| (110 g LOFTED R) | 24 | 0.49 | 235 | 2.1 | 0.8 | 8.7 | 0.6 | 2.0 |
| EXAMPLE IV | | | | | | | | |
| (GECET CORE) | 22 | 0.48 | 160 | 2.2 | 0.7 | 7.7 | 0.8 | 2.6 |
| (EPS CORE) | 24 | 0.49 | 75 | 1.6 | 0.3 | 2.8 | 0.5 | 1.6 |
| EXAMPLE V | 12 | 0.48 | 30 | 0.2 | 0.8 | 8.9 | 0.2 | 0.8 |
| (EPS CORE) | | | | | | | | |

R = LOFTED THERMOPLASTIC LAYER
*Specific Stiffness = Comparison of flexural modulus (FM) of material normalized to density of 3 ply plywood (41 lbs./cu. ft.) = $FM_{matl}/FM_{plywood}$ $(DENSITY_{plyw}/DENSITY_{matl})^3$
Specific Strength = Comparison of flexural strength (FS) of material normalized to density of 3 ply plywood (41 lbs./cu. ft.) = $FS_{matl}/FS_{plywood}$
* $(DENSITY_{plyw}/DENSITY_{matl})^2$
**"L" along the grain direction, "C" perpendicular to grain.

As illustrated by the data in Table I the laminates of the present invention, Examples 1–5, exhibit increased strength and stiffness as compared with conventional materials used in prefabricated structures such as 3 ply and 5 ply plywood, oriented strand board, and lofted thermoplastic resin.

Obviously, other modifications and variations of the present inventions are possible in light of the above teachings. It is therefore to be understood that changes may be made in particular embodiments of the invention described which are within the full intended scope of the invention as defined by the claims.

What is claimed is:

1. A lightweight, high strength laminate comprising:
   a. two spaced parallel sheets of fiber reinforced thermoset resin;
   b. at least two layers of fiber reinforced lofted thermoplastic resin laminated between the two parallel sheets of fiber reinforced thermoset resin; and
   c. a core layer of polyphenylene ether-polystyrene blend, polystyrene or polyurethane foam or mixtures thereof disposed between the thermoplastic resin layers.

2. A laminate according to claim 1 wherein the core layer is adhesively bonded to the thermoplastic layers.

3. A laminate according to claim 2 wherein the adhesive is a hot melt adhesive with a melting point between about 80° C. and about 120° C.

4. A laminate according to claim 1 having an outer layer on at least one side comprising about 10% to about 50% crosslinked acrylate elastomer, about 5% to about 35% crosslinked styrene-acrylonitrile copolymer, and about 15% to about 85% linear styrene-acrylonitrile copolymer.

* * * * *